US012592910B2

(12) United States Patent
Chen-Becker

(10) Patent No.: US 12,592,910 B2
(45) Date of Patent: Mar. 31, 2026

(54) MULTI-ROUTE VIRTUAL PRIVATE NETWORKING

(71) Applicant: Cisco Technology, Inc., San Jose, CA (US)

(72) Inventor: Derek W. R. Chen-Becker, Greenwood Village, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 18/799,687

(22) Filed: Aug. 9, 2024

(65) Prior Publication Data

US 2026/0046273 A1    Feb. 12, 2026

(51) Int. Cl.
*H04L 9/40* (2022.01)
*H04L 43/087* (2022.01)

(52) U.S. Cl.
CPC ........ *H04L 63/0272* (2013.01); *H04L 43/087* (2013.01)

(58) Field of Classification Search
CPC .............. H04L 63/0272; H04L 43/087; H04L 63/0281
USPC ......................................................... 726/15
See application file for complete search history.

(56) References Cited

U.S. PATENT DOCUMENTS

| | | | | |
|---|---|---|---|---|
| 7,127,742 B2 * | 10/2006 | Kramer | ............... | H04L 63/0272 |
| | | | | 713/160 |
| 8,134,923 B2 * | 3/2012 | Daures | ................ | H04L 63/0272 |
| | | | | 370/231 |
| 8,443,435 B1 * | 5/2013 | Schroeder | ............... | H04L 63/08 |
| | | | | 726/15 |
| 8,533,780 B2 | 9/2013 | Parla et al. | | |
| 9,137,211 B2 | 9/2015 | Parla et al. | | |
| 9,455,909 B2 | 9/2016 | Parla et al. | | |
| 10,581,803 B1 | 3/2020 | Chang | | |
| 11,916,701 B2 | 2/2024 | Viswambharan et al. | | |
| 2009/0234744 A1 * | 9/2009 | Kapila | ............... | G06Q 30/0241 |
| | | | | 705/14.72 |
| 2010/0125897 A1 | 5/2010 | Jain et al. | | |
| 2018/0248761 A1 | 8/2018 | Ng et al. | | |
| 2018/0255591 A1 * | 9/2018 | Valicherla | ........... | H04L 12/4641 |
| 2019/0109821 A1 * | 4/2019 | Clark | .................. | H04L 63/0414 |
| 2019/0139056 A1 | 5/2019 | Goldschlag et al. | | |
| 2020/0259795 A1 * | 8/2020 | Koshal | .................. | H04L 41/083 |
| 2023/0091527 A1 | 3/2023 | Sapp et al. | | |

* cited by examiner

*Primary Examiner* — Teshome Hailu
(74) *Attorney, Agent, or Firm* — Edell, Shapiro & Finnan, LLC

(57) ABSTRACT

A method, computer system, and computer program product are provided for a multi-route virtual private network. A virtual private network (VPN) concentrator generates network performance data indicating network conditions between the VPN concentrator and a server. The VPN concentrator receives additional network performance data indicating network conditions between at least one additional VPN concentrator and the server. The network performance data and the additional network performance data are provided to a client. In response to the client analyzing the network performance data and the additional network performance data to determine that a VPN connection to the server via the VPN concentrator satisfies one or more policy criteria, the VPN connection is established between the server and the client via the VPN concentrator.

20 Claims, 7 Drawing Sheets

<u>500</u>

START

502 — GENERATE, BY VPN CONCENTRATOR, NETWORK PERFORMANCE DATA

504 — RECEIVE, BY VPN CONCENTRATOR, ADDITIONAL NETWORK PERFORMANCE DATA

506 — PROVIDE COMBINED NETWORK PERFORMANCE DATA TO CLIENT

508 — IN RESPONSE TO CLIENT ANALYZING COMBINED NETWORK PERFORMANCE DATA, ESTABLISH VPN CONNECTION BETWEEN CLIENT AND SERVER VIA VPN CONCENTRATOR

END

MULTI-ROUTE VIRTUAL PRIVATE NETWORKING

TECHNICAL FIELD

The present disclosure relates generally to networking technology and virtual private networks.

BACKGROUND

A virtual private network (VPN) is a mechanism for creating a secure connection between a computing device and a computer network using another network (e.g., the Internet). A VPN can extend access to a private network to remote users who do not have direct access to the private network, enabling users to access resources as if the users were on-site.

VPNs may include multiple different points of access, which can be implemented using VPN concentrators. A VPN concentrator manages VPN traffic for multiple users, providing a tunnel for each client device to connect to other resources within the VPN. However, end users connecting to servers, SaaS applications, or other resources through a VPN often struggle to determine a particular VPN concentrator that provides the best connection. This uncertainty leads to inconsistent user experiences due to variations in latency, throughput, and packet loss across different VPN concentrators.

DETAILED DESCRIPTION

Overview

Figure 1A:
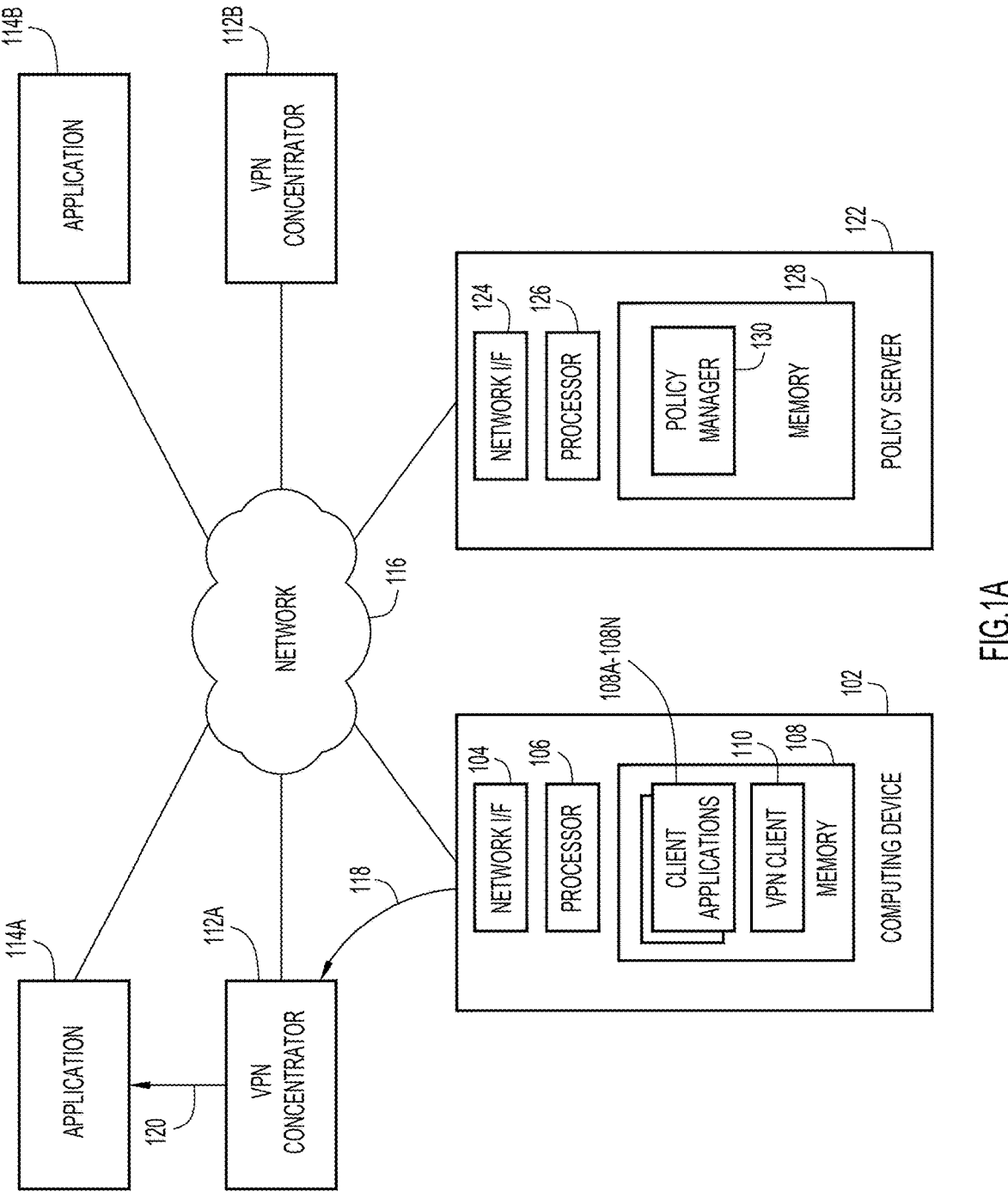
FIGS. 1A and 1B are block diagrams depicting a network environment for a multi-route virtual private network, in which the techniques presented herein may be employed, according to an example embodiment.

According to one embodiment, techniques are provided for a multi-route virtual private network (VPN). A VPN concentrator generates network performance data indicating network conditions between the VPN concentrator and a server. The VPN concentrator receives additional network performance data indicating network conditions between at least one additional VPN concentrator and the server. The network performance data and the additional network performance data are provided to a client. In response to the client analyzing the network performance data and the additional network performance data to determine that a VPN connection to the server via the VPN concentrator satisfies one or more policy criteria, the VPN connection is established between the server and the client via the VPN concentrator.

EXAMPLE EMBODIMENTS

Present embodiments relate to networking technology, and more specifically, to virtual private networks (VPNs). In some conventional VPNs, end-user devices may have an option to select a particular point of access to the VPN. These points of access can be implemented using VPN concentrators, which are networking devices or software that provides secure, remote access to an organization's network. VPN concentrators can establish and manage multiple VPN connections, allowing remote users to connect to the network securely.

However, a user may not know which VPN concentrator to select when joining a VPN, as different VPN concentrators might provide varying levels of user experience based on network conditions, the load of the VPN concentrators, and other factors. For example, while a user may be able to select between three different VPN concentrators, the user may not have knowledge of which VPN concentrator will provide the lowest latency at that time. Moreover, as network conditions change over time, users may not be aware that a different VPN concentrator may provide better connectivity as compared to the VPN concentrator that is currently in use.

The embodiments described herein address the shortcomings of conventional VPN technology by providing an optimized multi-path VPN mesh for end users that delivers an improved application experience. When a client device connects to a remote application through a VPN, an optimal VPN concentrator can be selected for the VPN connection. In particular, the available VPN concentrators can determine the current network conditions between each VPN concentrator and the target application. A client device can also perform testing to determine the current network conditions between the client device and each of the VPN concentrators. Using this data, the client device can identify a particular VPN concentrator that will provide the most optimal connection to the target application (which can be determined according to a selection policy).

Thus, the embodiments presented herein improve the technical field of virtual private networking by automatically optimizing the network paths between client devices and applications in a VPN environment. Moreover, this process can be performed repeatedly and on a per-application basis so that a client device continues to provide the best user experience in the face of changing network conditions. The embodiments presented herein provide several practical applications, including reducing latency, increasing bandwidth, reducing packet loss and jitter, and providing load balancing across available VPN concentrators.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

Figure 1B:
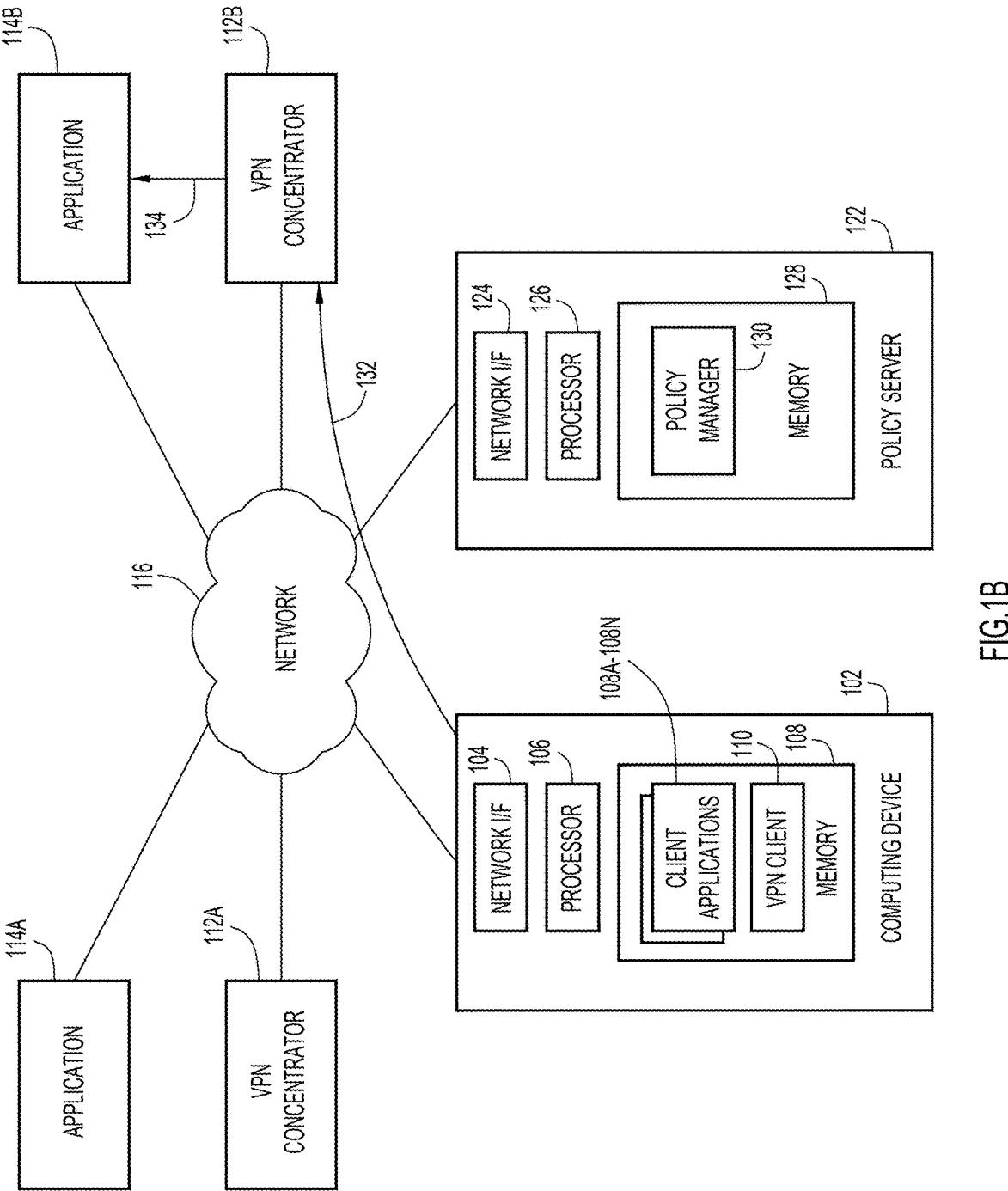

With reference now to FIGS. 1A and 1B, block diagrams are provided depicting a network environment 100 for a multi-route virtual private network, in which the techniques presented herein may be employed, according to an example embodiment. FIGS. 1A and 1B illustrate examples of different network paths that can be used by a client (e.g., computing device 102) to access a remote application (e.g., application 114A and/or application 114B).

With reference to FIG. 1A, network environment 100 includes a computing device 102, VPN concentrators 112A and 112B, applications 114A and 114B, and a policy server 122 that are in communication via a network 116. It is to be understood that the functional division among components have been chosen for purposes of explaining various embodiments and is not to be construed as a limiting example.

Computing device 102 includes a network interface (I/F) 104, at least one processor (computer processor) 106, and memory 108 (which stores instructions for client applications 108A-108N and VPN client 110). In various embodiments, computing device 102 may include a rack-mounted server, laptop, desktop, smartphone, tablet, or any other programmable electronic device capable of executing computer readable program instructions. Network interface 104 may be a network interface card that enables components of computing device 102 to send and receive data over a network, such as network 116. Computing device 102 may be any endpoint device that is configured to connect to remote computing resources (e.g., applications 114A and/or 114B) via a VPN.

Client applications 108A-108N and VPN client 110 may include one or more modules or units to perform various functions of the embodiments described below. Client applications 108A-108N and VPN client 110 may be implemented by any combination of any quantity of software and/or hardware modules or units, and may reside within memory 108 of computing device 102 for execution by a processor, such as processor 106.

Client applications 108A-108N may include any software program that runs on computing device 102 and interacts with a server (e.g., applications 114A and/or 114B) to access services, resources, or data over a network. Each client application 108A-108N can submit requests to applications 114A and/or 114B, and applications 114A and/or 114B can provide the services in response. Client applications 108A-108N can each be configured to perform a variety of computing tasks, including accessing databases, retrieving web pages, sending emails, playing media, running complex computations, or participating in audio, and/or video communication sessions. As such, each client application 108A-108N can include an application programming interface (API), an email client, a web browser, a remote desktop client, and the like.

Client applications 108A-108N may access a remote service (e.g., applications 114A and/or 114B) via a VPN connection. VPN client 110 may be configured to connect to a VPN in accordance with the embodiments presented herein and can route network traffic of computing device 102 through the VPN. VPN client 110 can be configured to establish a secure and encrypted connection to a VPN by authenticating computing device 102, initiating the VPN connection, and ensures that all desired data transmitted between computing device 102 and the any network entities within the VPN is encrypted, thereby maintaining privacy and security. VPN client 110 can be configured to automatically connect to a VPN (e.g., on log-in or boot of computing device 102), and can support one or more VPN protocols.

VPN client 110 can route traffic of different client applications 108A-108N through different VPN concentrators in accordance with the embodiments presented herein. Thus, the traffic of different client applications 108A-108N may be routed through different VPN concentrators simultaneously in order to optimize the connection and user experience for each client application 108A-108N. VPN client 110 may select particular VPN concentrators according to a policy that can be defined by policy server 122 and received from policy server 122 and/or a VPN concentrator (e.g., VPN concentrator 112A and/or 112B). The policy may indicate which VPN concentrator should be selected by VPN client 110 for a particular client application 108A-108N based on considerations such as bandwidth, latency, loss, jitter, load, and the like. In particular, VPN client 110 may perform synthetic tests by transmitting samples of data to each VPN concentrator 112A and 112B to obtain the data that is used by VPN client 110 to select a particular VPN concentrator. Similarly, each VPN concentrator 112A and 112B may perform similar synthetic tests with respect to applications 114A and 114B to obtain data that can also be used by VPN client 110 to make routing decisions.

VPN concentrators 112A and 112B may each include a device or software system designed to provide secure and encrypted connections for multiple VPN tunnels. Each VPN concentrator 112A and 112B may manage VPN connections for multiple endpoint devices (e.g., computing device 102). In addition to providing the VPN tunnels, each VPN concentrator 112A and 112B may perform various functions such as encrypting and decrypting data, authenticating users and devices, traffic management, and session management (e.g., terminating inactive sessions). As such, each VPN concentrator 112A and 112B may include one or more processors, memory to store and process data, multiple wired network connections, and storage for secure storage of policies and other data.

VPN concentrators 112A and/or 112B may be configured to route traffic from endpoint devices through a VPN to applications 114A and/or 114B. Applications 114A and/or 114B may each include server-side applications within a VPN such as a corporate network. Each application 114A and/or 114B may perform computing operations based on requests received from client applications (e.g., any of client applications 108A-108N). In particular, a client application may establish a VPN communication session with either of VPN concentrator 112A and/or 112B via either of VPN concentrator 112A and/or 112B. In some embodiments, applications 114A and 114B may be different instances of a same application. Either VPN concentrator 112A or 112B may connect to either application 114A or 114B.

Policy server 122 includes a network interface (I/F) 124, at least one processor (computer processor) 126, and memory 128 (which stores instructions for a policy manager 130). In various embodiments, policy server 122 may include a rack-mounted server, laptop, desktop, smartphone, tablet, or any other programmable electronic device capable of executing computer readable program instructions. Network interface 124 may be a network interface card that enables components of policy server 122 to send and receive data over a network, such as network 116. Policy server 122 may be configured to provide policies for routing traffic through a multi-route VPN in accordance with the embodiments described herein.

Policy manager 130 may include one or more modules or units to perform various functions of the embodiments described below. Policy manager 130 may be implemented by any combination of any quantity of software and/or hardware modules or units, and may reside within memory 128 of policy server 122 for execution by a processor, such as processor 126. Policy manager 130 may receive one or more policies for routing VPN traffic, which can indicate how to select a particular VPN concentrator for an endpoint device based on network conditions. In particular, the policy can indicate which VPN concentrator to select for a client application based on measured network conditions such as bandwidth, latency, loss, jitter, load, either between an endpoint device (e.g., computing device 102) and a VPN concentrator (e.g., VPN concentrator 112A), between a VPN concentrator and an application (e.g., application 114A and/or 114B), or a combination thereof (e.g., the bandwidth, latency, loss, jitter, load conditions across a full route). In some embodiments, the policy can indicate that a particular VPN concentrator should be selected by a client based on a highest bandwidth, a lowest latency, a lowest loss, a lowest jitter, and/or a lowest load condition upon VPN concentrator. The policy can indicate that a particular VPN concentrator should be selected based on a primary network performance criterion (e.g., any of bandwidth, latency, loss, jitter, load, etc.), with a second or more criterion being used as a tie-breaker. In some embodiments, different network performance criteria can have different weights applied, and an overall score can be determined for each network path, with a lowest or highest score indicating the particular network path (and therefore VPN concentrator) to use. In some embodiments, policies may include defined expiration times. In some embodiments, a policy may expire after a predetermined amount of time, causing client devices and/or VPN concentrators to refresh (e.g., causing each entity to perform synthetic testing, and causing clients to be reconnected accordingly). In some embodiments, policy expiration may cause failure of the VPN network in order to enforce an upper bound on policy staleness.

Network 116 may include a local area network (LAN), a wide area network (WAN) such as the Internet, or a combination of the two, and includes wired, wireless, or fiber optic connections. In general, network 116 can be any combination of connections and protocols known in the art that will support communications between computing device 102, VPN concentrators 112A and 112B, applications 114A and 114B, and/or policy server 122 via their respective network interfaces in accordance with the described embodiments.

In the depicted embodiment of FIG. 1A, a VPN channel is selected based on the network performance conditions that includes a route 118 from computing device 102 to VPN concentrator 112A, and a route 120 from VPN concentrator 112A to application 114A.

With reference now to FIG. 1B, a different VPN channel is selected that includes a route 132 from computing device 102 to VPN concentrator 112B, and a route 134 from VPN concentrator 112B to application 114B. In various embodiments, the VPN channel of FIG. 1B that includes routes 132 and 134 may selected as an alternative to the VPN channel of FIG. 1B, or the VPN channel of FIG. 1B may be utilized at a different point in time as compared to the VPN channel of FIG. 1A. In some embodiments, the VPN channel of FIG. 1B may be selected when computing device 102 connects to the VPN and determines that, according to the policy for VPN selection and the determined network performance criteria, the path that includes routes 132 and 134 should be selected. However, VPN client 110 can reevaluate the network performance criteria over time (or the policy can be updated), and may determine that the path of FIG. 1B should be selected over the path of FIG. 1A, causing computing device 102 to switch to the path of FIG. 1B

Figure 2:
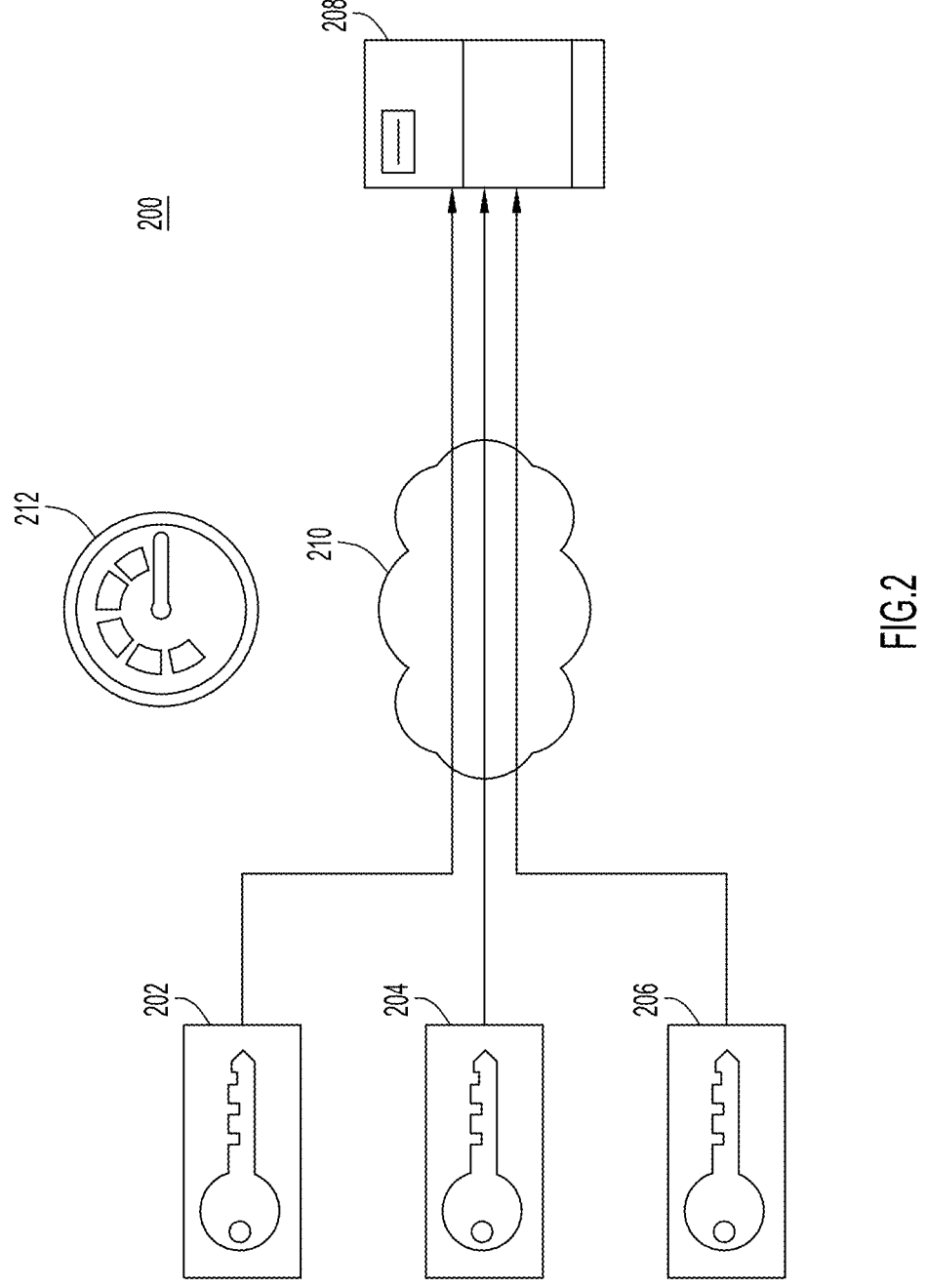
FIG. 2 is a block diagram depicting a network environment for a multi-route virtual private network, according to an example embodiment.

With reference now to FIG. 2, a block diagram is provided depicting a network environment 200 for a multi-route virtual private network, according to an example embodiment. As depicted, network environment 200 includes three VPN concentrator 202, 204, and 206, an application 208, a network 210, and network performance data 212. While network environment 200 illustrates VPN concentrators 202, 204, and 206 connecting to a same application 208, it should be appreciated that the endpoint that a given concentrator reaches may differ due to load balancing.

Each VPN concentrator 202, 204, and 206 may utilize policy information to configure and perform synthetic performance tests to various application endpoints. Clients can then query the VPN concentrator 202, 204, and 206 for network performance data 212 and use the data in combination with the client's own data to determine an optimal path to an application (e.g., application 208). The synthetic tests may include a same sample of test data that each VPN concentrator 202, 204, and 206 uses to communicate with application 208 to determine the network conditions for each path through network 210. An example of the network performance data 212 that can be obtained by performing the synthetic tests is provided in Table 1.

TABLE 1

| Concentrator | Latency | Loss | Jitter | Load |
|---|---|---|---|---|
| 202 | 40 milliseconds (ms) | 0.8% | 5 ms | 40% |
| 204 | 55 ms | 2% | 10 ms | 60% |
| 206 | 20 ms | 6% | 5 ms | 50% |

In this example, each concentrator 202, 204, and 206 determines a latency, loss, and jitter with respect to application 208, as well as a load for each concentrator. The load criterion can include a processing load (e.g., an amount of processor utilization) or a network load (e.g., a number of different VPN connections supported as compared to a maximum number of connections).

Continuing with the example of FIG. 2, concentrator 202 is shown to have a latency of 40 ms, a packet loss of 0.8%, a jitter of 5 ms, and a load of 40%. Concentrator 204 has a latency of 55 ms, a packet loss of 2%, a jitter of 10 ms, and a load of 60%. Finally, concentrator 206 has a latency of 20 ms, a packet loss of 6%, a jitter of 5 ms, and a load of 50%. The network performance data for each concentrator 202, 204, and 206 can be shared with the other concentrators so that any concentrator can provide a full set of network performance data to clients.

Figure 3:
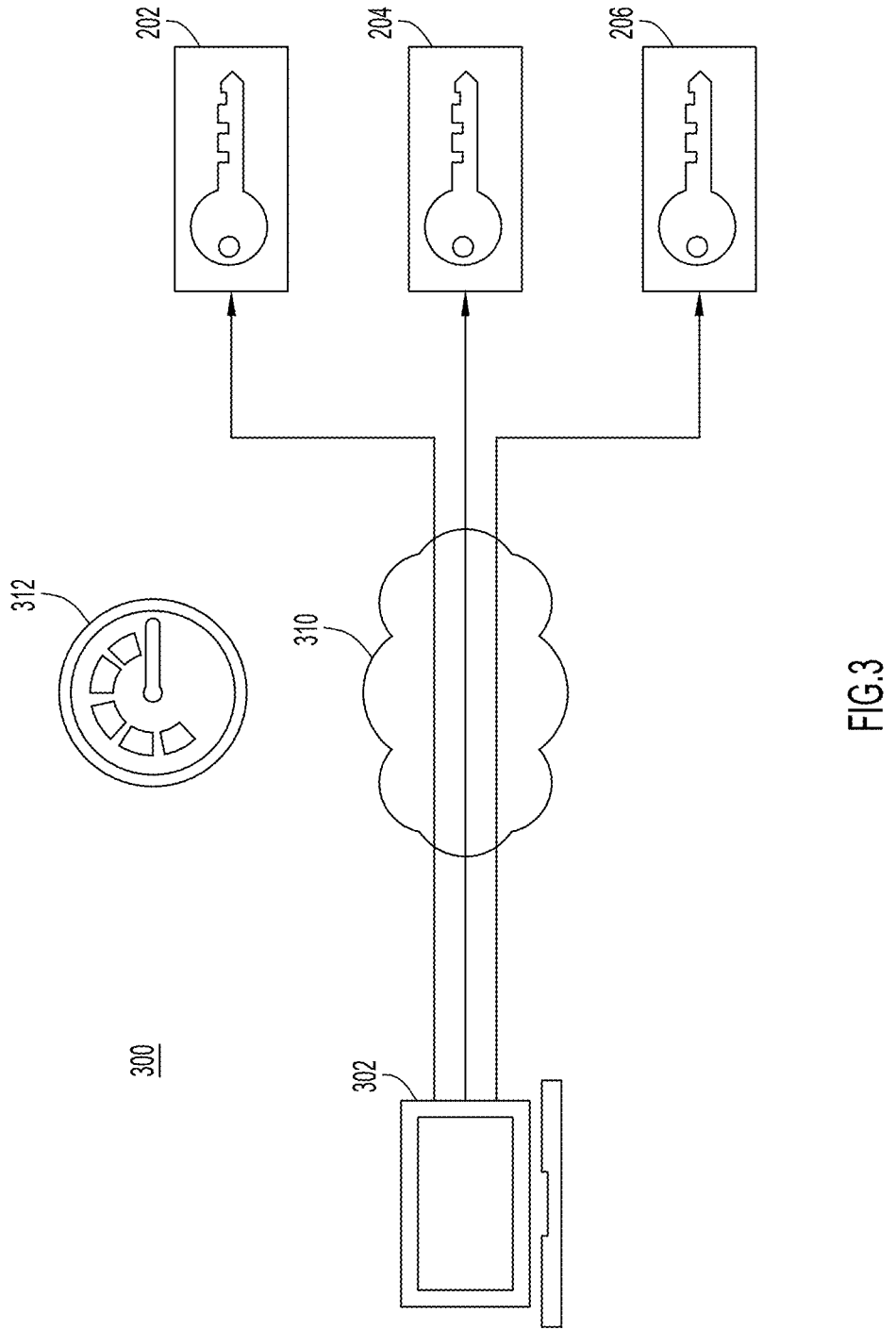
FIG. 3 is a block diagram depicting a network environment for a multi-route virtual private network, according to an example embodiment.

With reference now to FIG. 3, a block diagram is provided depicting a network environment 300 for a multi-route virtual private network, according to an example embodiment. As depicted, network environment 300 includes a client device 302, VPN concentrators 202, 204, and 206, a network 310, and network performance data 312. VPN concentrators 202, 204, and 206 are also depicted and described with reference to FIG. 2, as the network environments of network environment 200 (FIG. 2) and network environment 300 (FIG. 3) may be combined to provide a full path between client device 302 (FIG. 3) and application 208 (FIG. 2).

With reference still to FIG. 3, client device 302 may generate network performance data 312 by performing synthetic testing with respect to each VPN concentrator 202, 204, and 206. Similarly to the synthetic testing performed by VPN concentrators with respect to a server-side application, the synthetic testing by client device 302 may include communicating with each VPN concentrator 202, 204, and 206 to exchange a same sample of data for the synthetic testing. The data used for synthetic testing may be substantially similar to the data that is exchanged between the client and a server-side application through a VPN in terms of the volume of data, protocol(s) used, and the like.

Thus, client device 302 may perform synthetic testing by exchanging data through network 310 to each of VPN concentrators 202, 204, and 206 to obtain network performance data 312. In some embodiments, one or more VPN concentrators may serve as a seed concentrator that a client is configured to utilize for initial communications; a seed concentrator may be configured to identify other available concentrators and provide a client with a full listing of concentrators. For example, client device 302 may connect initially to VPN concentrator 202 (a seed concentrator), which provides a listing of available concentrators so that client device 302 can also be aware of, and perform synthetic testing with, VPN concentrators 204 and 206.

An example of the network performance data 312 that can be obtained by performing the synthetic tests is provided in Table 2.

TABLE 2

| Concentrator | Latency | Loss | Jitter |
|---|---|---|---|
| 202 | 30 ms | 1% | 10 ms |
| 204 | 40 ms | 2% | 10 ms |
| 206 | 30 ms | 4% | 5 ms |

Thus, in the example embodiment of network environment 300, client device 302 obtains network performance data measuring various network conditions between client device 302 and each of VPN concentrators 202, 204, and 206. In the example of Table 2, concentrator 202 is measured to have a latency of 30 ms, a loss of 1%, and a jitter of 10 ms; concentrator 204 has a latency of 40 ms, a loss of 2%, and a jitter of 10 ms; and concentrator 206 has a latency of 30 ms, a loss of 4%, and a jitter of 5 ms.

Client device 302 may perform the synthetic testing and may initially connect to a VPN concentrator that is determined to have the preferred network performance criteria (as indicated by the defined policy). For example, if a policy assigns weights to influence the importance of each network criterion such that latency has the greatest influence, then jitter, and finally loss, then VPN concentrator 206 may be selected by client device 302. Once client device 302 authenticates with the VPN network via VPN concentrator 206, client device 302 can request that the concentrator (in this case, VPN concentrator 206) provide the network performance data that is generated by the VPN concentrators performing synthetic testing with respect to a server-side application. Following the examples of FIGS. 2 and 3, VPN concentrator 206 may provide client device 302 with the network performance data 212 that is presented in Table 1.

The network performance data 212 can be combined by client device 302 with the network performance data 312 generated by client device 302 to provide a complete view of network conditions between client device 302 and application 208. This combined data is provided in Table 3, which, in this example, combines the data from Tables 1 and 2.

TABLE 3

| Concentrator | Latency | Loss | Jitter |
|---|---|---|---|
| 202 | 30 ms + 40 ms = 70 ms | 1%, 0.8% | 10 ms, 5 ms |
| 204 | 40 ms + 55 ms = 95 ms | 2%, 2% | 10 ms, 10 ms |
| 206 | 30 ms + 20 ms = 50 ms | 4%, 6% | 5 ms, 5 ms |

Based on the combined network performance data and a policy that prioritizes latency over loss and loss over jitter, client device 302 may select VPN concentrator 206 as the concentrator through which to establish a VPN connection to application 208. Note that the policy may indicate how to combine these various network performance criteria; latency can be combined in an additive manner, whereas loss and jitter can be combined by averaging the values.

Still with reference to FIGS. 2 and 3, as another example, client device 302 may also connect to a second application through the same available VPN concentrators. A different policy may be assigned for this second application that assigns a higher weight to packet loss than to latency. According to this policy, instead of selecting VPN concentrator 206, VPN concentrator 202 would instead be selected, as the packet loss (1%, 0.8%) is the lowest out of the available VPN concentrators. Thus, in addition to the VPN tunnel to application 208, a second VPN tunnel can be established between client device 302 and the second application that utilizes VPN concentrator 202.

As another example with reference to FIGS. 2 and 3, the embodiments presented herein can dynamically make VPN routing changes as network conditions change over time. A second client device (not shown) may generate network performance data in network environment as shown in Table 4.

TABLE 4

| Concentrator | Latency | Loss | Jitter |
|---|---|---|---|
| 202 | 60 ms | 5% | 10 ms |
| 204 | 15 ms | 2% | 5 ms |
| 206 | 50 ms | 4% | 20 ms |

This second client device can likewise obtain network performance data regarding the conditions between VPN concentrators 202, 204, and 206 and application 208 to select a particular VPN concentrator. This combined network performance data is shown in Table 5, which combines the data from Tables 1 and 4.

TABLE 5

| Concentrator | Latency | Loss | Jitter |
|---|---|---|---|
| 202 | 60 ms + 40 ms = 100 ms | 5%, 0.8% | 10 ms, 5 ms |
| 204 | 15 ms + 55 ms = 65 ms | 2%, 2% | 5 ms, 10 ms |
| 206 | 50 ms + 20 ms = 70 ms | 4%, 6% | 20 ms, 5 ms |

Based on the combined values (shown in Table 5), the second client may utilize a policy for application 208 that indicates that latency should be prioritized, and therefore, select VPN concentrator 204 for connecting to application 208. If there is a second application having a policy that prioritizes loss, then the second client may likewise select VPN concentrator 204, and a single VPN tunnel can be used through VPN concentrator 204 for reaching both applications.

While the examples described with reference to FIGS. 2 and 3 relate to measurements that include latency, loss, and jitter, embodiments presented herein can accommodate other types of measurements via various weighting and scoring policies. As an example, a policy may consider the conditions of a VPN concentrator itself, such as processor utilization and/or number of connected clients. For example, using a combination of weights applied to the network performance data, a VPN concentrator may be selected by a client in a case where one or more of the criteria such as latency, loss, and jitter may be preferable when using a first VPN concentrator, but because a second VPN concentrator has a lower overall processor utilization and/or number of connected clients, the second VPN concentrator is chosen. By extending consideration to the load of the VPN concentrators, load balancing can be performed while also optimizing for the best route. Thus, a network policy can provide a fine-grained control over distribution of client devices.

Figure 4:
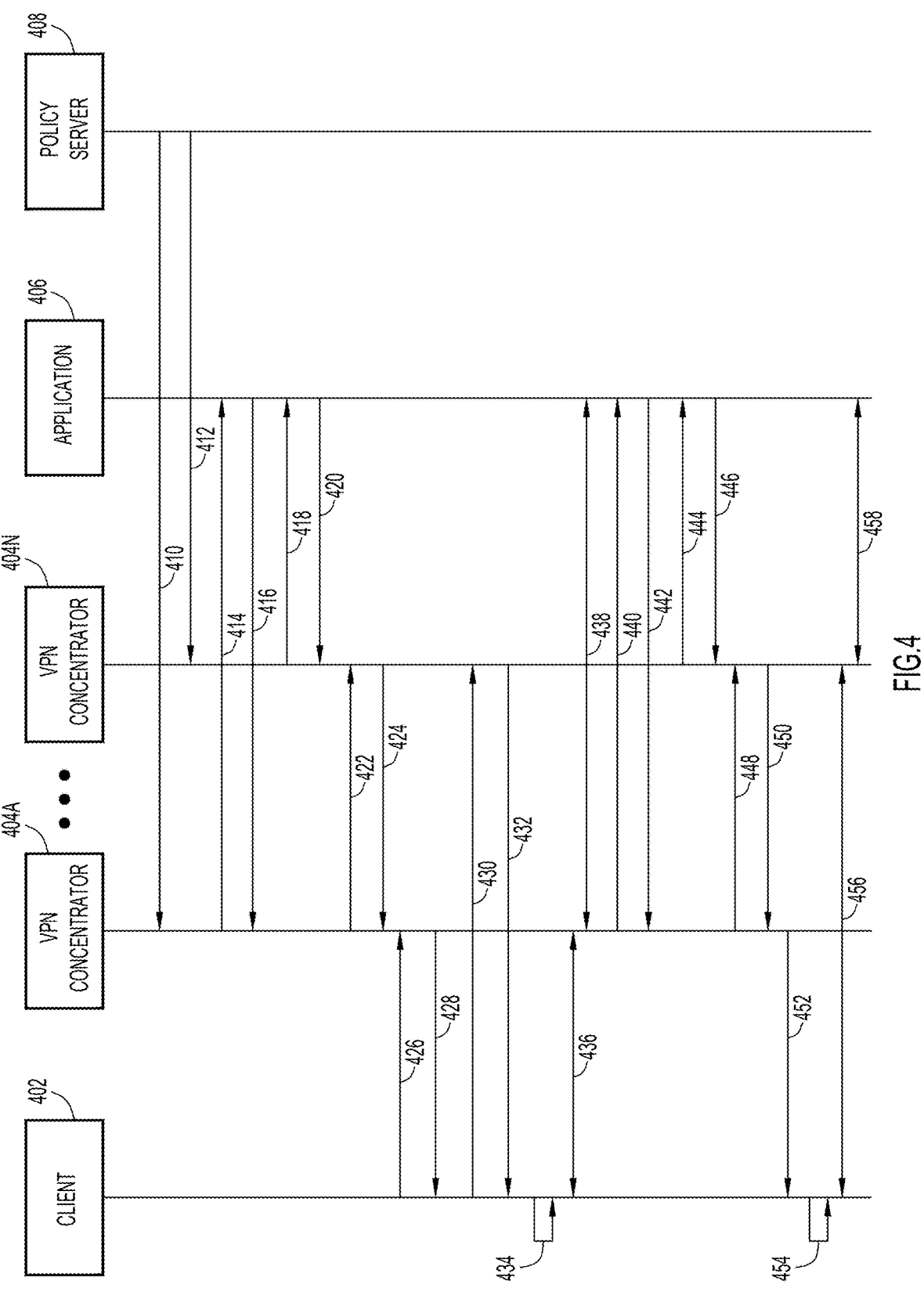
FIG. 4 is a signaling sequence diagram depicting a network environment in which a multi-route virtual private network is employed, according to an example embodiment.

With reference to FIG. 4, a signaling sequence diagram is provided depicting a network environment 400 in which a multi-route virtual private network is employed, according to an example embodiment. Network environment 400 includes a client 402, a plurality of VPN concentrators 404A-404N, an application 406, and a policy server 408.

Initially, policy server 408 may provide a policy to each VPN concentrator 404A-404N at operations 410 and 412. The policy defines criteria that a client uses to select a VPN concentrator, and can be based on latency, loss, jitter, VPN concentrator load, and/or other conditions. It should be appreciated that in various embodiments, the policy can be provided to one VPN concentrator, which can provide the policy to the other VPN concentrators, or policy server 408 may provide the policy to client 402 directly. Thus, policies can be cached on the VPN concentrators.

At operations 414 and 416, VPN concentrator 404A performs synthetic testing with respect to application 406 by exchanging test data with application 406 to generate network performance data that can include latency, loss, jitter, and the like. Each VPN concentrator may likewise perform synthetic testing; as depicted, VPN concentrator 404N performs synthetic testing at operations 418 and 420.

At operations 422 and 424, VPN concentrators 404A and 404N share their respective network performance data with each other. Each VPN concentrator may provide network performance data with the other VPN concentrators. This data may be shared in a peer-to-peer manner.

At operations 426 and 428, client 402 queries VPN concentrator 404A to identify the other VPN concentrators and/or to perform synthetic testing of the network conditions between client 402 and VPN concentrator 404A. At operations 430 and 432, client 402 performs synthetic testing to determine network conditions between client 402 and VPN concentrator 404N. Additionally, at operations 428 and/or 432, client 402 may receive the network performance data from VPN concentrators 404A-404N that is generated based on synthetic testing between VPN concentrators 404A-404N and application 406. However, since this data can be shared among VPN concentrators 404A-404N, client 402 may query a single VPN concentrator to obtain the full set of data.

Accordingly, client 402 may perform synthetic testing with each identified VPN concentrator 404A-404N until network performance data is obtained that is descriptive of all available VPN concentrators 404A-404N, and client 402 may also obtain additional network performance data that describes network conditions between VPN concentrators 404A-404N and application 406. At operation 434, client 402 can process the combined network performance data using the defined policy to identify a particular VPN concentrator through which to connect to application 406. In this example, client 402 may determine that VPN concentrator 404A should be utilized, and so client 402 joins a VPN network via VPN concentrator 404A at operation 436 to reach application 406 at operation 438.

The embodiments presented herein enable dynamic rerouting of VPN connections in response to changing network conditions. At operations 440 and 442, VPN concentrator performs additional synthetic testing to obtain updated network performance data. Likewise, VPN concentrator 404N performs additional synthetic testing at operations 444 and 446. The results of each synthetic test can be shared among VPN concentrators 404A-404N, as shown in operations 448 and 450, and provided to client 402 (operation 452). Additionally or alternatively, client 402 may perform additional synthetic testing (not shown) to identify any change in network conditions.

Based on the updated set of network performance data, client 402 may determine that a different VPN concentrator should be used to access application 406 at operation 454. Thus, client 402 may select a different route for application data by establishing a VPN connection through concentrator 404N (operation 456) to application 406 (operation 458).

Figure 5:
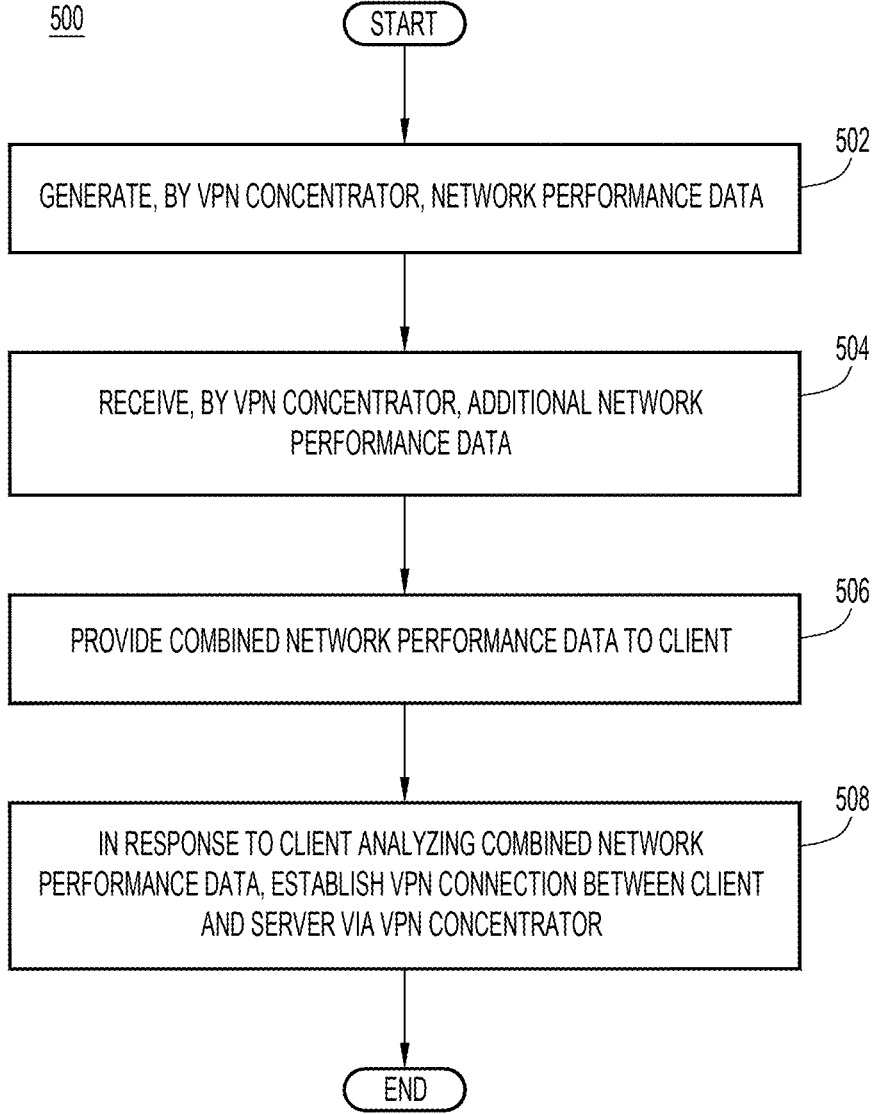
FIG. 5 is a flow chart depicting a method for utilizing a multi-route virtual private network, according to an example embodiment.

FIG. 5 is a flow chart depicting a method 500 for utilizing a multi-route virtual private network, according to an example embodiment.

At operation 502, a VPN concentrator generates network performance data indicating network conditions between the VPN concentrator and a server. The VPN concentrator may perform synthetic testing by exchanging data with a server to measure network conditions such as latency, packet loss, jitter, and the like.

At operation 504, the VPN concentrator may receive additional network performance data that indicates network conditions between at least one other VPN concentrator and the server. A group of VPN concentrators may each independently perform synthetic testing with the server and share their results with each of the other VPN concentrators.

At operation 506, the combined network performance data of the VPN concentrator and at least one other VPN concentrator is provided to a client. The client thus receives data that is descriptive of network conditions between each available VPN concentrator and the server to which the client is attempting to connect via a VPN connection.

At operation 508, the client analyzes the combined network performance data and optionally, additional network performance data that the client itself generates by performing synthetic testing with each VPN concentrator. The set of network performance data can be evaluated by the client against a defined network policy to identify a particular VPN concentrator through which the VPN concentrator should connect to the server. In response to the client identifying a particular VPN concentrator, a VPN connection is established between the client and server via the identified VPN concentrator.

Figure 6:
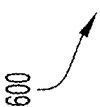
FIG. 6 is a block diagram of a device that may be configured to perform operations relating to multi-route virtual private networks, as presented herein.

Referring now to FIG. 6, FIG. 6 illustrates a hardware block diagram of a computing device 600 that may perform functions associated with operations discussed herein in connection with the techniques depicted in FIGS. 1A-5. In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allow for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In some aspects, the techniques described herein relate to a computer-implemented method including: generating, by a virtual private network (VPN) concentrator, network performance data indicating network conditions between the VPN concentrator and a server; receiving, by the VPN concentrator, additional network performance data indicating network conditions between at least one additional VPN concentrator and the server; providing the network performance data and the additional network performance data to a client; and in response to the client analyzing the network performance data and the additional network performance data to determine that a VPN connection to the server via the VPN concentrator satisfies one or more policy criteria, establishing the VPN connection between the server and the client via the VPN concentrator.

In some aspects, the techniques described herein relate to a computer-implemented method, wherein the network performance data includes one or more of: a latency measure, a packet loss measure, and a jitter measure.

In some aspects, the techniques described herein relate to a computer-implemented method, wherein the one or more policy criteria are selected from a group of: a latency criterion, a packet loss criterion, a jitter criterion, and a VPN concentrator load criterion.

In some aspects, the techniques described herein relate to a computer-implemented method, wherein the one or more policy criteria include at least two policy criteria, and wherein different weights are applied to each of the at least two policy criteria.

In some aspects, the techniques described herein relate to a computer-implemented method, further including: generating, by the VPN concentrator, updated network performance data; and providing the updated network performance data to the client.

In some aspects, the techniques described herein relate to a computer-implemented method, wherein the VPN concentrator provides, to the at least one additional VPN concentrator, the network performance data indicating the network conditions between the VPN concentrator and the server.

In some aspects, the techniques described herein relate to a computer-implemented method including: obtaining, by a client from a VPN concentrator, network performance data indicating network conditions between a plurality of VPN concentrators and a server; generating, by the client, local network performance data indicating network conditions between the client and each of the plurality of VPN concentrators; analyzing, by the client, the network performance data and the local network performance data to identify a particular VPN concentrator of the plurality of VPN concentrators through which to establish a VPN connection to the server, wherein the particular VPN concentrator is identified based on a comparison of the network performance data and the local network performance data to one or more policy criteria; and establishing, by the client, the VPN connection to the server via the particular VPN concentrator.

In some aspects, the techniques described herein relate to a computer-implemented method, wherein the network performance data includes one or more of: a latency measure, a packet loss measure, and a jitter measure.

In some aspects, the techniques described herein relate to a computer-implemented method, wherein the client routes network traffic from a first application of the client through the VPN connection, and wherein the client routes other network traffic through a separate VPN connection.

In some aspects, the techniques described herein relate to a computer-implemented method, further including: obtaining, by the client from the VPN concentrator, updated network performance data; analyzing the updated network performance data according to the one or more policy criteria to identify a different VPN concentrator through which to connect to the server; and establishing a new VPN connection between the client and the server through the different VPN concentrator.

In some aspects, the techniques described herein relate to a computer-implemented method, further including: generating, by the client, updated local network performance data; analyzing the updated local network performance data according to the one or more policy criteria to identify a different VPN concentrator through which to connect to the server; and establishing a new VPN connection between the client and the server through the different VPN concentrator.

In some aspects, the techniques described herein relate to a computer-implemented method, wherein the one or more policy criteria are selected from a group of: a latency criterion, a packet loss criterion, a jitter criterion, and a VPN concentrator load criterion.

In some aspects, the techniques described herein relate to a computer-implemented method, wherein the one or more policy criteria include at least two policy criteria, and wherein different weights are applied to each of the at least two policy criteria.

In some aspects, the techniques described herein relate to a computer-implemented method, wherein the client receives the one or more policy criteria from the VPN concentrator.

In some aspects, the techniques described herein relate to a system including: one or more computer processors; one or more computer readable storage media; and program instructions stored on the one or more computer readable storage media for execution by at least one of the one or more computer processors, the program instructions including instructions to: generate, by a VPN concentrator, network performance data indicating network conditions between the VPN concentrator and a server; receive, by the VPN concentrator, additional network performance data indicating network conditions between at least one additional VPN concentrator and the server; provide the network performance data and the additional network performance data to a client; and in response to the client analyzing the network performance data and the additional network performance data to determine that a VPN connection to the server via the VPN concentrator satisfies one or more policy criteria, establish the VPN connection between the server and the client via the VPN concentrator.

In some aspects, the techniques described herein relate to a system, wherein the network performance data includes one or more of: a latency measure, a packet loss measure, and a jitter measure.

In some aspects, the techniques described herein relate to a system, wherein the one or more policy criteria are selected from a group of: a latency criterion, a packet loss criterion, a jitter criterion, and a VPN concentrator load criterion.

In some aspects, the techniques described herein relate to a system, wherein the one or more policy criteria include at least two policy criteria, and wherein different weights are applied to each of the at least two policy criteria.

In some aspects, the techniques described herein relate to a system, wherein the program instructions further include instructions to: generate, by the VPN concentrator, updated network performance data; and provide the updated network performance data to the client.

In some aspects, the techniques described herein relate to a system, wherein the VPN concentrator provides, to the at least one additional VPN concentrator, the network performance data indicating the network conditions between the VPN concentrator and the server.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
generating, by a virtual private network (VPN) concentrator device, network performance data indicating network conditions between the VPN concentrator device and a server;
receiving, by the VPN concentrator device, additional network performance data indicating network conditions between at least one additional VPN concentrator device and the server;
providing the network performance data and the additional network performance data to a client; and
in response to the client analyzing the network performance data and the additional network performance data to determine that a VPN connection to the server via the VPN concentrator device satisfies one or more policy criteria, establishing the VPN connection between the server and the client via the VPN concentrator device, wherein the one or more policy criteria include at least two policy criteria from a group of: a latency criterion, a packet loss criterion, a jitter criterion, and a VPN concentrator load criterion, and wherein different weights are applied to each of the at least two policy criteria.

2. The computer-implemented method of claim 1, wherein the network performance data includes one or more of: a latency measure, a packet loss measure, and a jitter measure.

3. The computer-implemented method of claim 1, wherein the client routes network traffic from a first application of the client through the VPN connection, and the client routes other network traffic through a separate VPN connection.

4. The computer-implemented method of claim 1, further comprising:
obtaining, by the client from the VPN concentrator device, updated network performance data:
analyzing the updated network performance data according to the one or more policy criteria to identify the at least one different VPN concentrator device through which to connect to the server; and
establishing a new VPN connection between the client and the server through the at least one different VPN concentrator device.

5. The computer-implemented method of claim 1, further comprising:
generating, by the VPN concentrator device, updated network performance data; and
providing the updated network performance data to the client.

6. The computer-implemented method of claim 1, wherein the VPN concentrator device provides, to the at least one additional VPN concentrator device, the network performance data indicating the network conditions between the VPN concentrator device and the server.

7. A computer-implemented method comprising:
obtaining, by a client from a VPN concentrator device, network performance data indicating network conditions between a plurality of VPN concentrator devices and a server;
generating, by the client, local network performance data indicating network conditions between the client and each of the plurality of VPN concentrator devices;
analyzing, by the client, the network performance data and the local network performance data to identify a particular VPN concentrator device of the plurality of VPN concentrator devices through which to establish a VPN connection to the server, wherein the particular VPN concentrator device is identified based on a comparison of the network performance data and the local network performance data to one or more policy criteria, wherein the one or more policy criteria include at least two policy criteria from a group of: a latency criterion, a packet loss criterion, a jitter criterion, and a VPN concentrator load criterion, and wherein different weights are applied to each of the at least two policy criteria; and
establishing, by the client, the VPN connection to the server via the particular VPN concentrator device.

8. The computer-implemented method of claim 7, wherein the network performance data includes one or more of: a latency measure, a packet loss measure, and a jitter measure.

9. The computer-implemented method of claim 7, wherein the client routes network traffic from a first application of the client through the VPN connection, and wherein the client routes other network traffic through a separate VPN connection.

10. The computer-implemented method of claim 7, further comprising:

obtaining, by the client from the particular VPN concentrator device, updated network performance data;

analyzing the updated network performance data according to the one or more policy criteria to identify a different VPN concentrator device through which to connect to the server; and establishing a new VPN connection between the client and the server through the different VPN concentrator device.

11. The computer-implemented method of claim 7, further comprising:

generating, by the client, updated local network performance data;

analyzing the updated local network performance data according to the one or more policy criteria to identify a different VPN concentrator device through which to connect to the server; and establishing a new VPN connection between the client and the server through the different VPN concentrator device.

12. The computer-implemented method of claim 7, wherein the particular VPN concentrator device provides, to at least one additional VPN concentrator, the network performance data indicating the network conditions between the particular VPN concentrator device and a server.

13. The computer-implemented method of claim 7, further comprising determining from the different weights applied to each of the at least two policy criteria an overall score for a network path for each of the plurality of VPN concentrator devices, and selecting the particular VPN concentrator device based on a lowest or highest score.

14. The computer-implemented method of claim 7, wherein the client receives the one or more policy criteria from the particular VPN concentrator device.

15. A system comprising:

one or more computer processors;

one or more non-transitory computer readable storage media; and program instructions stored on the one or more non-transitory computer readable storage media for execution by at least one of the one or more computer processors, the program instructions comprising instructions to:

generate, by a VPN concentrator, network performance data indicating network conditions between the VPN concentrator and a server;

receive, by the VPN concentrator, additional network performance data indicating network conditions between at least one additional VPN concentrator and the server;

provide the network performance data and the additional network performance data to a client; and in response to the client analyzing the network performance data and the additional network performance data to determine that a VPN connection to the server via the VPN concentrator satisfies one or more policy criteria, establish the VPN connection between the server and the client via the VPN concentrator, wherein the one or more policy criteria include at least two policy criteria from a group of: a latency criterion, a packet loss criterion, a jitter criterion, and a VPN concentrator load criterion, and wherein different weights are applied to each of the at least two policy criteria.

16. The system of claim 15, wherein the network performance data includes one or more of: a latency measure, a packet loss measure, and a jitter measure.

17. The system of claim 15, wherein the client routes network traffic from a first application of the client through the VPN connection, and the client routes other network traffic through a separate VPN connection.

18. The system of claim 15, wherein the program comprises instructions to:

determining from the different weights applied to each of the at least two policy criteria an overall score for a network path for each of a plurality of VPN concentrator devices, and selecting a particular VPN concentrator device based on a lowest or highest overall score.

19. The system of claim 15, wherein the program instructions further comprise instructions to:

generate, by the VPN concentrator, updated network performance data; and provide the updated network performance data to the client.

20. The system of claim 15, wherein the VPN concentrator provides, to the at least one additional VPN concentrator, the network performance data indicating the network conditions between the VPN concentrator and the server.

* * * * *